United States Patent [19]

Anderson

[11] Patent Number: 4,788,245

[45] Date of Patent: Nov. 29, 1988

[54] SELF-AMALGAMATING MATERIAL

[75] Inventor: James Anderson, Massillon, Ohio

[73] Assignee: Radiation Dynamics, Inc., Melville, N.Y.

[21] Appl. No.: 112,041

[22] Filed: Oct. 22, 1987

Related U.S. Application Data

[63] Continuation of Ser. No. 842,248, Mar. 21, 1986, abandoned.

[51] Int. Cl.$^4$ .............................................. C08K 3/04
[52] U.S. Cl. .................................. 524/518; 524/496; 524/519; 524/525
[58] Field of Search ............... 524/525, 496, 519, 518; 428/36, 355

[56] References Cited

U.S. PATENT DOCUMENTS

| | | | |
|---|---|---|---|
| 2,569,540 | 10/1951 | Selby . | |
| 3,684,644 | 8/1972 | Snell . | |
| 3,704,196 | 11/1972 | Callan . | |
| 3,876,454 | 4/1975 | Snell et al. | 428/522 |
| 3,900,999 | 8/1975 | Cauan | 428/495 |
| 4,024,312 | 5/1977 | Korpman | 428/909 |
| 4,071,652 | 1/1978 | Brullo | 428/355 |
| 4,102,835 | 7/1978 | Freeman et al. | 428/220 |
| 4,209,130 | 6/1980 | Sundsrud et al. | 428/355 |
| 4,264,490 | 4/1981 | Berejka | 525/232 |
| 4,268,334 | 5/1981 | Harris et al. | 428/355 |
| 4,287,034 | 9/1981 | Pieslak et al. | 428/355 |
| 4,298,712 | 11/1981 | Machonis et al. | 525/74 |
| 4,299,930 | 11/1981 | Boggs | 525/74 |
| 4,300,988 | 11/1981 | Berejka | 524/571 |
| 4,305,851 | 12/1981 | Tominaga et al. | 524/571 |
| 4,455,204 | 6/1984 | Pieslak et al. | 428/355 |
| 4,455,348 | 6/1984 | Pokorny | 428/377 |
| 4,521,470 | 6/1985 | Overbergh et al. | 428/212 |

Primary Examiner—Herbert J. Lilling
Attorney, Agent, or Firm—Hall, Myers & Rose

[57] ABSTRACT

A material capable of self-amalgamation without adjunct heating and use as a wraparound tape at substantially the full range of ambient terrestrial temperatures composed of a rubber component, a polyisobutylene tackifier, a $C_2$–$C_3$ polyolefin and filler is provided.

12 Claims, No Drawings

SELF-AMALGAMATING MATERIAL

This is a continuation of application Ser. No. 842,248, filed Mar. 21, 1986, now abandoned.

TECHNICAL FIELD

This invention relates to materials capable of self-amalgamation and more particularly to a heterogenous rubber composition which provides thermally self-fusing material.

BACKGROUND OF THE INVENTION

Thermally fusible materials are known and have been employed in industry principally directed to pipe, cable and tube protection. These materials prove particularly useful in field operations involving cable or pipe on which repairs have been necessary. Environmental and corrosion protection of splices or other repairs to the conduit is necessary to maintain structural integrity. Self-amalgamating materials in the form of tape will provide such protection by forming a unitary protective layer over such repairs. An environmentally secure seal is established by wrapping a self-amalgamating tape around the affected area whereupon a unitary covering is achievable. Such a tape is composed of fusible butyl rubber; that is, a tape made from a butyl rubber material which has a capacity to fuse to itself at the overlap when wound on wire or cable, stretched to approximately double its original length, and upon application of heat, fuses or self-amalgamates at the overlap in approximately five minutes. Such products are available from such companies as Thomas & Betts and Nitto Electric Industrial Company, Ltd. of Japan.

Although satisfactory for use in ambient environments of restricted temperature range, most commercially available products do not function well at extreme temperatures and generally require heat application to effect amalgamation. For example, it has been found that diminution of certain desirable physical characteristics occur at high ambient temperatures. When employed in environments with temperatures approaching 40°–50° C. as in tropical or equatorial desert regions, many commercially available materials suffer a significant loss of tensile strength. Correspondingly, such products also suffer from considerably reduced self-amalgamation when subjected to procedures at temperatures much less than 0° C. Particularly in the context of field applications in northern climates, this constitutes a serious operational restriction where cable splicing repairs may be necessary at temperatures approaching −20° C.

Accordingly, what is needed is a material which has the capacity for self-amalgamation and possesses superior physical characteristics at low temperatures; namely, a short self-amalgamation time, high physical strength and a high percent of elongation. Furthermore, a material is desirable which does not require adjunct heating, particularly at low ambient temperatures. Moreover, when employed at low ambient temperatures, a product should not, unlike many commercially available products, become stiff and brittle, thereby leading to difficulties in field applications.

SUMMARY OF THE INVENTION

Accordingly, it is an object of the instant invention to overcome the above-mentioned difficulties and to satisfy the above-identified needs.

It is another object of this invention to provide a self-amalgamating material in the form of a tape which permits application at low ambient temperatures in the field.

It is a further object of this invention to reduce or eliminate adjunct heating to induce amalgamation of the material.

Still another object of the invention is to provide a material which self-amalgamates in a short set time and provides a covering of good physical strength, good percent elongation, high flexibility and manipulability even at low temperatures.

These and other objects of the invention are satisfied by a composition of matter comprising not more than 52 parts of a rubber component selected from the group consisting of conjugated diene butyl rubber, halobutyl rubber, not more than 20 parts of polyisobutylene tackifier, not more than 10 parts of polyethylene, and not more than 40 parts of filler carbon black and antioxident.

Compositions of matter which is the subject of this invention, was arrived at through a laborious experimental process. The tables and explanations contained herein underscore the significant experimental efforts that were dedicated to this project and more clearly demonstrate the evolution of the invention.

The investigation started with a control of a known formulation for a polybutylene conjugated diene butyl rubber (CDB) (disclosed in U.S. Pat. No. 3,775,387 and 3,816,371, both incorporated herein by reference) blend, self-amalgamating material (see Formula 1 in Table 1 below). Due to the limited percent elongation, the brittleness and the difficulty in manipulation of this material at low temperatures, i.e., below 0° C., it was desirable to find a substitute material. An appropriate substitute would self-amalgamate without adjunct heating as well as to demonstrate the satisfactory physical properties at high temperatures, i.e. strength, % elongation, tear resistance, etc., and manifest similar properties at low temperatures. A liquid tackifier was substituted for the solid (Formula 2) where it was anticipated that the substitution would enhance the percent elongation. The anticipated increase was realized but was accompanied by a reduction in tensile strength of the material. Accordingly, this avenue was abandoned. The foregoing exemplified a pattern in much of the remaining experimentation where enhancement of the one characteristic was more than offset by the diminution of another(s).

Due to the negative results obtained from the substitution of the tackifier, linear low density polyethylene (LLDPE) was substituted for the polybutylene of Formula 1. It was found that some increase in percent elongation at low temperatures was achieved, but the tensile strength dropped. These are evidenced by Formulas 3, 4, 5 and 6 in the table set forth below.

Next tried was replacement of ethylvinylacetate (EVA) for the linear low density polyethylene (LLDPE). This substitution helped to establish whether or not the more crystalline polymer component had a dilaterious effect on either self-amalgamation or the physical characteristics of the material. It was found, as evidenced by Formulas 7 and 8, that the percent elongation was diminished at low temperatures.

Turning from the polymeric component to alternate rubber formulations, all elastomeric compositions were evaluated. Ethylene propylene diene monomer rubber (EPDM) was substituted for the linear low density polyethylene (LLDPE). As noted in Formulas 9 and 10, relatively lower tensile strength resulted from this substitution. Formulas 11 and 12 represent combinations of the ethylvinylacetate (EVA) and ethylene propylene diene monomer rubber (EPDM). The relatively lesser material costs when compared with the CDB component spurred this analysis. However, relatively lower tensile strength and modulus were obtained. It was found that these components yielded adequate physical characteristics. Next, as represented by Formulas 13-20, concentrations of the tackifier Wingtack TM 10 were adjusted in an attempt to maximize desired physical characteristics. No definitive results were obtained from these materials, but, as already noted above, substitution of liquid tackifier for the solid tackifier reduced the tensile strength and, accordingly, was avoided.

The investigation then led to exploration of alternative tackifiers of differing chemical properties. When Vistanex LM-MS, a polyisobutylene tackifier, was substituted for the Wingtack TM 10, the tensile strength of the material increased, particularly around room temperature, and the percent elongation was enhanced (see Formulas 21-24).

In combining the attributes of this substitution with and those obtained from the LLDPE substitution, preferred formulations were found which are disclosed in the table set forth below as Formulas 25-27. More particularly, Formula 27 was determined to optimize the most desired characteristics of tensile strength, percent elongation at break, tear resistance, self-amalgamation without adjunct heating, etc. over a broad temperature range. These combined properties are required of a material suitable for field use as a self-amalgamating, environmentally sealing tape.

In order to confirm that the favorable results of the "Vistanex" formulation resulted from the inclusion of the Vistanex LM-MS as the tackifier, compositions 28-33 were compounded. The results of physical testing on these formulations did, indeed, demonstrate that the Vistanex formulas were preferred.

| Control | CDB-76 | Vistanex LM-MS | Carbon Black N550 | Carbon Black N990 | Butyl 1600 | LLDPE 2045 | Elvax 40W | Elvax 660 |
|---|---|---|---|---|---|---|---|---|
| 1 | 48.88 | — | 24.44 | — | 13.79 | — | — | — |
| 2 | 48.88 | — | 24.44 | — | 13.79 | — | — | — |
| 3 | 48.88 | — | 24.44 | — | 10.03 | 3.76 | — | — |
| 4 | 48.88 | — | 24.44 | — | 6.27 | 7.52 | — | — |
| 5 | 48.88 | — | 24.44 | — | 3.76 | 10.03 | — | — |
| 6 | 48.88 | — | 24.44 | — | — | 13.79 | — | — |
| 7 | 48.88 | — | 24.44 | — | — | 6.89 | 6.89 | — |
| 8 | 48.88 | — | 24.44 | — | — | — | 13.79 | — |
| 9 | 48.88 | — | 24.44 | — | — | 6.89 | — | — |
| 10 | 48.88 | — | 24.44 | — | — | — | — | — |
| 11 | 48.88 | — | 24.44 | — | — | — | 6.89 | — |
| 12 | 52.50 | — | 24.44 | 13.46 | — | — | — | 1.77 |
| 13 | 50.8 | — | 25.4 | — | — | 7.2 | — | — |
| 14 | 44.9 | — | 22.5 | — | — | 6.3 | — | — |
| 15 | 40.3 | — | 20.15 | — | — | 5.7 | — | — |
| 16 | 44.9 | — | 22.5 | — | — | 6.3 | — | — |
| 17 | 32.4 | — | 20.15 | — | — | 14.6 | — | — |
| 18 | 46.3 | 14.8 | 23.1 | — | — | 6.5 | — | — |
| 19 | — | — | 23.1 | — | — | 6.5 | — | — |
| 20 | 48.88 | — | — | — | — | 6.89 | — | — |
| 21 | 43.68 | 14.0 | 21.84 | 24.44 | — | 6.16 | — | — |
| 22 | 41.37 | 13.26 | 20.68 | — | — | 5.83 | — | — |
| 23 | 42.26 | 13.55 | 21.13 | — | — | 5.96 | — | — |
| 24 | 41.37 | 13.26 | 20.68 | — | — | 5.83 | — | — |
| 25 | 42.26 | 13.55 | 21.13 | — | — | 5.96 | — | — |
| 26 | 42.26 | 13.55 | 21.13 | — | — | 5.96 | — | — |
| 27 | 42.26 | 13.55 | 21.13 | — | — | 5.96 | — | — |
| 28 | 43.20 | 13.85 | — | 21.60 | — | 6.09 | — | — |
| 29 | 46.00 | — | 23.00 | — | — | — | — | — |
| 30 | 43.44 | — | 21.72 | — | — | — | — | — |
| 31 | 46.00 | — | 23.00 | — | — | 6.49 | — | — |
| 32 | 43.44 | — | 21.72 | — | — | 6.13 | — | — |
| 33 | 41.15 | — | 20.57 | — | — | — | — | — |

| Control | (EPDM) Vistalon 1721 | Wingtak 10 | Irganox 1010 | AC-6 PE | Escorez 1315 | Norsorex 150 | Wingtack 95 | SST 80 or 100 |
|---|---|---|---|---|---|---|---|---|
| 1 | — | — | 0.98 | 1.88 | 10.03 | — | — | — |
| 2 | — | 10.03 | 0.98 | 1.88 | — | — | — | — |
| 3 | — | 10.03 | 0.98 | 1.88 | — | — | — | — |
| 4 | — | 10.03 | 0.98 | 1.88 | — | — | — | — |
| 5 | — | 10.03 | 0.98 | 1.88 | — | — | — | — |
| 6 | — | 10.03 | 0.98 | 1.88 | — | — | — | — |
| 7 | — | 10.03 | 0.98 | 1.88 | — | — | — | — |
| 8 | — | 10.03 | 0.98 | 1.88 | — | — | — | — |
| 9 | 6.89 | 10.03 | 0.98 | 1.88 | — | — | — | — |
| 10 | 13.79 | 10.03 | 0.98 | 1.88 | — | — | — | — |
| 11 | 6.89 | 10.03 | 0.98 | 1.88 | — | — | — | — |
| 12 | 6.73 | 13.46 | 1.05 | 2.02 | — | — | — | — |
| 13 | 7.2 | — | 1.02 | 1.90 | 6.5 | — | — | — |
| 14 | 6.3 | — | 0.90 | 1.70 | 17.3 | — | — | — |
| 15 | 5.7 | — | 0.80 | 1.55 | 25.8 | — | — | — |
| 16 | 6.3 | 17.3 | 0.90 | 1.73 | — | — | — | — |
| 17 | 14.6 | 25.8 | 0.81 | 1.55 | — | — | — | — |

-continued

| | | | | | | | | |
|---|---|---|---|---|---|---|---|---|
| 18 | 6.5 | — | 0.91 | 1.80 | — | — | — | — |
| 19 | 6.5 | 8.9 | 0.93 | 1.78 | 5.9 | 46.39 | — | — |
| 20 | 6.89 | — | 0.98 | 1.88 | 10.03 | — | — | — |
| 21 | 6.16 | — | 0.87 | 1.68 | 5.60 | — | — | — |
| 22 | 5.83 | — | 0.83 | 1.59 | 10.61 | — | — | — |
| 23 | 5.96 | 8.67 | 0.85 | 1.63 | — | — | — | — |
| 24 | 5.83 | 5.30 | 0.83 | 1.59 | 5.30 | — | — | — |
| 25 | 5.96 | — | 0.85 | 1.63 | — | — | — | (80) 8.67 |
| 26 | 5.96 | — | 0.85 | 1.63 | — | — | — | (100) 8.67 |
| 27 | 5.96 | — | 0.85 | 1.63 | — | — | 8.67 | — |
| 28 | 6.09 | — | 0.86 | 1.66 | 6.65 | — | — | — |
| 29 | — | 5.09 | 0.92 | 1.77 | — | — | 9.44 | — |
| 30 | — | 11.14 | 0.87 | 1.67 | — | — | 8.91 | — |
| 31 | 6.49 | 5.90 | 0.92 | 1.77 | — | — | 9.44 | — |
| 32 | 6.13 | 11.14 | 0.87 | 1.67 | — | — | 8.91 | — |
| 33 | — | 15.83 | 0.82 | 1.58 | — | — | 8.44 | — |

The following tables set forth the experimental results obtained from the testing of the physical properties of the formulations contained in Table 1.

| | Tensile at Break | | | | | | | % Elongation | | | | |
|---|---|---|---|---|---|---|---|---|---|---|---|---|
| | 50° C. | 23° C. | 0° C. | −10° C. | −20° C. | −30° C. | −40° C. | 50° C. | 23° C. | 0° C. | −10° C. | −20° C. |
| 1 | >146.18 | >331.57 | >665.07 | >1036.15 | >1645.58 | 1524.51 | 2156.00 | >480 | >640 | >480 | >480 | >480 |
| 2 | >126.58 | 258.07 | >467.95 | >741.43 | >1113.12 | 1501.95 | 1502.67 | >480 | 595 | >480 | >480 | >480 |
| 3 | >101.27 | >209.88 | >499.80 | >722.75 | >1118.02 | >1603.93 | 2005.73 | >480 | >635 | >480 | >480 | >480 |
| 4 | 124.22 | 235.20 | >534.35 | >751.93 | >1189.23 | 1526.79 | 1506.15 | 405 | 420 | >480 | >480 | >480 |
| 5 | 139.49 | 245.45 | >553.46 | >771.02 | >1134.11 | >1486.17 | 1536.15 | 380 | 415 | >480 | >480 | >480 |
| 6 | 159.25 | 280.12 | >579.18 | >834.96 | >1280.53 | >1434.72 | 1698.67 | 420 | 445 | >480 | >480 | >480 |
| 7 | 120.05 | 249.90 | >545.53 | >855.05 | >1113.12 | >1425.90 | 1367.10 | 460 | 570 | >480 | >480 | >480 |
| 8 | 753.07 | >198.45 | >422.22 | >659.05 | >1049.42 | >1609.16 | 1416.92 | >480 | >640 | >480 | >480 | >480 |
| 9 | >133.18 | 288.28 | >522.59 | >770.93 | >1229.08 | >1567.76 | >1755.83 | >480 | 565 | >480 | >480 | >480 |
| 10 | >84.04 | >217.56 | >381.47 | >600.25 | >989.55 | >1401.72 | >1568.22 | >480 | >640 | >480 | >480 | >480 |
| 11 | >64.52 | >214.78 | >421.40 | >618.22 | >1012.67 | >1376.90 | 1437.33 | >480 | >640 | >480 | >480 | >480 |
| 12 | >35.93 | >143.73 | >236.02 | >287.47 | >703.60 | >966.19 | >1302.86 | >480 | >640 | >480 | >480 | >480 |
| 13 | 220.75 | 348.39 | >739.41 | >1238.07 | >1471.63 | >1682.33 | 1723.71 | 425 | 445 | >480 | >480 | >480 |
| 14 | >85.75 | >72.68 | >524.30 | >914.67 | >1119.65 | >1336.88 | 3601.50 | >480 | >640 | >480 | >480 | >480 |
| 15 | >36.75 | >45.02 | >482.35 | >957.34 | >1238.47 | 992.25 | 4125.19 | >480 | >640 | >480 | >480 | >480 |
| 16 | 53.90 | 122.01 | >285.02 | >491.63 | >754.60 | >1021.05 | >1216.00 | 415 | 465 | >480 | >480 | >480 |
| 17 | 52.27 | 162.52 | >339.73 | >536.55 | >802.78 | >1087.80 | >1363.83 | 415 | 585 | >480 | >480 | >480 |
| 18 | >235.20 | 427.22 | >637.00 | >838.72 | >1143.33 | 1377.57 | >1788.50 | >475 | 525 | >480 | >480 | >480 |
| 19 | 291.24 | 851.03 | 1424.06 | 1699.69 | 1975.31 | 2155.39 | 2407.10 | 420 | 425 | 345 | 295 | 255 |
| 20 | >181.56 | >300.13 | >465.26 | >847.46 | >1004.50 | >1380.98 | >1962.45 | >480 | >640 | >480 | >480 | >480 |
| 21 | >155.17 | >239.79 | >424.67 | >688.14 | >978.37 | >1389.15 | >1747.67 | >480 | >480 | >480 | >480 | >480 |
| 22 | >68.70 | >159.84 | >311.97 | >528.38 | >729.28 | >1306.67 | >1076.33 | >480 | >480 | >480 | >480 | >480 |
| 23 | >63.39 | >144.90 | >249.90 | >429.88 | >685.39 | >1088.72 | >1708.88 | >480 | >480 | >480 | >480 | >480 |
| 24 | >54.21 | >126.79 | >248.06 | >466.73 | >601.78 | >1067.59 | >1993.69 | >480 | >480 | >480 | >480 | >480 |
| 25 | >94.63 | >200.90 | >356.88 | >612.09 | >765.22 | >1228.27 | >2278.50 | >480 | >480 | >480 | >480 | >480 |
| 26 | >91.88 | >176.40 | >378.73 | >553.70 | >863.63 | >1405.69 | >1388.33 | >480 | >480 | >480 | >480 | >480 |
| 27 | >95.55 | >207.90 | >358.31 | >583.80 | >785.63 | >1380.98 | >1388.33 | >480 | >480 | >480 | >480 | >480 |
| 28 | >54.21 | >140.47 | >234.28 | >350.04 | >563.19 | >1022.57 | >1061.67 | >480 | >480 | >480 | >480 | >480 |
| 29 | 93.92 | 169.87 | >544.72 | >754.60 | >1197.95 | >1735.42 | 1275.63 | 420 | 616 | >480 | >480 | >480 |
| 30 | 74.32 | 128.22 | >533.28 | >723.57 | >1098.42 | >1708.47 | 1387.31 | 430 | 575 | >480 | >480 | >480 |
| 31 | >94.73 | >186.69 | >409.15 | >614.95 | >1037.58 | >1558.20 | >1419.47 | >480 | >640 | >480 | >480 | >480 |
| 32 | >43.28 | >108.62 | >273.58 | >481.83 | >886.59 | >1357.91 | 1248.58 | >480 | >640 | >480 | >480 | >480 |
| 33 | 32.16 | 115.15 | >348.20 | >589.84 | >1038.19 | >1469.18 | 1372.61 | 375 | 475 | >480 | >480 | >480 |

| | % Elongation | | For CSA (sq in)~.01 100% Modulus | | | | | | | T Peel Test | *Procedure described | |
|---|---|---|---|---|---|---|---|---|---|---|---|---|
| | −30° C. | −40° C. | 50° C. | 23° C. | 0° C. | −10° C. | −20° C. | −30° C. | −40° C. | Pounds per linear inch | (lb f/inch) Tear Resistance | Shore Hardness |
| 1 | 835 | 60 | 47.37 | 128.22 | 293.18 | 520.12 | 857.40 | 1429.27 | — | 5.80 | 89.53 | 55 |
| 2 | 435 | 305 | 41.65 | 108.62 | 191.10 | 326.16 | 590.45 | 1007.56 | 1617.00 | 3.20 | 62.13 | |
| 3 | >480 | 395 | 33.48 | 93.10 | 216.42 | 311.97 | 599.43 | 950.60 | 1380.98 | 2.92 | 59.61 | |
| 4 | 465 | 430 | 36.75 | 147.74 | 216.42 | 392.49 | 699.72 | 925.43 | 1477.35 | 3.78 | 81.63 | |
| 5 | >480 | 425 | 84.69 | 176.56 | 326.24 | 443.94 | 701.19 | 784.98 | 1389.15 | 3.56 | 83.15 | |
| 6 | >480 | 455 | 95.55 | 195.18 | 319.73 | 457.91 | 765.22 | 1004.01 | 1584.33 | 2.86 | 85.65 | |
| 7 | >480 | 335 | 47.73 | 125.77 | 267.05 | 458.97 | 619.85 | 1048.60 | 1330.35 | 4.20 | 72.39 | |
| 8 | >480 | 415 | 7.35 | 59.62 | 149.45 | 241.57 | 455.72 | 740.69 | 1340.15 | 3.70 | 50.40 | |
| 9 | >480 | >480 | 58.80 | 159.66 | 256.50 | 373.22 | 577.38 | 799.68 | 1503.56 | 3.76 | 75.51 | |
| 10 | >480 | >480 | 26.79 | 80.85 | 155.09 | 233.24 | 380.00 | 740.35 | 1403.85 | 3.88 | 61.45 | |
| 11 | >480 | 435 | 9.80 | 72.68 | 167.42 | 235.20 | 453.25 | 810.13 | 1486.33 | 3.28 | 53.40 | |
| 12 | >480 | <480 | 6.53 | 54.72 | 102.90 | 117.60 | 269.28 | 516.51 | 1029.00 | 4.34 | 38.52 (no break) | |
| 13 | >480 | 470 | 126.58 | 224.91 | 371.18 | 596.17 | 837.08 | 959.58 | 1486.33 | 1.89 | 106.93 | 62 |
| 14 | >480 | 50 | 52.27 | 49.00 | 246.63 | 489.13 | 818.30 | 1091.88 | — | 5.54 | 64.36 | 48 |
| 15 | 105 | 15 | 25.73 | 33.99 | 236.12 | 599.94 | 910.28 | 1025.33 | — | 3.80 | 49.66 | 46 |

-continued

| | | | | | | | | | | | | |
|---|---|---|---|---|---|---|---|---|---|---|---|---|
| 16 | >480 | >480 | 44.02 | 105.35 | 159.25 | 266.23 | 383.83 | 637.00 | 1135.17 | 2.06 | 47.27 | 46 |
| 17 | >480 | >480 | 40.83 | 106.17 | 178.85 | 275.22 | 446.72 | 711.32 | 1192.33 | 2.46 | 58.51 | 48 |
| 18 | >480 | >480 | 66.33 | 170.89 | 226.22 | 322.58 | 509.60 | 691.72 | 1061.67 | 2.20 | 86.83 | 54 |
| 19 | 235 | 155 | 72.58 | 190.18 | 385.88 | 588.00 | 900.38 | 1332.19 | 2177.44 | 1.36 | 80.23 | 61 |
| 20 | >480 | >480 | 58.95 | 84.93 | 162.44 | 338.84 | 432.83 | 643.53 | 1080.45 | 4.67 | 92.25 | 39 |
| 21 | >480 | >480 | 53.90 | 95.55 | 161.70 | 256.33 | 362.60 | 583.92 | 1053.50 | 1.92 | 67.70 | 47 |
| 22 | >480 | >480 | 31.65 | 82.69 | 140.47 | 221.32 | 345.45 | 563.50 | 1127.00 | 1.89 | 52.27 | 38 |
| 23 | >480 | >480 | 24.81 | 76.65 | 118.52 | 192.02 | 264.60 | 461.93 | 863.63 | 1.48 | 47.57 | 45 |
| 24 | >480 | >480 | 23.89 | 61.56 | 112.09 | 189.27 | 267.36 | 429.98 | 1038.19 | 1.78 | 45.92 | 35 |
| 25 | >480 | >480 | 39.51 | 88.20 | 152.72 | 270.01 | 305.43 | 537.37 | 1102.50 | 3.15 | 59.81 | 37 |
| 26 | >480 | >480 | 36.75 | 75.34 | 150.67 | 227.03 | 364.74 | 660.58 | 1176.00 | 2.30 | 60.18 | 42 |
| 27 | >480 | >480 | 29.40 | 69.28 | 128.63 | 233.10 | 337.28 | 632.10 | 1102.50 | 1.67 | 62.42 | 42 |
| 28 | >480 | >480 | 16.54 | 40.83 | 86.36 | 126.79 | 243.47 | 408.84 | 775.83 | 2.88 | 46.39 | 32 |
| 29 | >480 | 185 | 44.92 | 84.93 | 236.02 | 345.45 | 618.01 | 940.80 | 1349.95 | 4.80 | 63.87 | 38 |
| 30 | >480 | 140 | 40.83 | 84.12 | 257.25 | 327.48 | 527.57 | 915.48 | 1502.16 | 3.90 | 59.48 | 37 |
| 31 | >480 | >480 | 35.93 | 88.20 | 194.37 | 257.25 | 487.55 | 741.13 | 1278.90 | 6.06 | 68.49 | 36 |
| 32 | >480 | >345 | 16.33 | 64.52 | 126.58 | 226.22 | 402.41 | 716.63 | 1171.41 | 4.04 | 44.32 | 37 |
| 33 | >480 | 75 | 20.21 | 85.75 | 191.10 | 323.40 | 561.36 | 843.62 | — | 2.37 | 35.63 | 29 |

Summarizing the preferred composition for practice of the invention, it is:
42.26% - CDB-76 (Exxon Chemical Co.)
5.96% - Dow 2045 (Linear low density Polyethylene - Dow Chemical)
5.96% - Vistalon 1721 (EPDM - Exxon Chemical Co.)
13.55% - Vistanex LM-MS (Polyisobutylene tackifier - Exxon Chemical Co.)
8.67% - Wingtack (Tackifier - Goodyear Rubber Co.)
21.13% - Carbon Black N550
1.88% - AC-6 (Wax-like dispersion agent for Carbon Black - Allied Chemical Co.)
0.85% - Irganox 1010 (Antioxident - Ciba Giegy Co.)

Referring briefly to the compounding method, it involved mixing the components in a Banbury mixer at approximately 125° C.-130° C. for a sufficient time, generally less than 3 minutes, to achieve a uniform blend. The blend was extruded into 2 inch strips of 0.6 inch thickness onto a nylon carrier sheet and then exposed to a 4 Mrad dose of electron beam irradiation to cross-link the blend.

Conjugated Diene Butyl rubber is expensive in comparison to conventional elastomers. Accordingly, it was also desirable to define components of a less expensive composition.

It was found that those desired physical properties and self-amalgamation exhibited from CDB blends were also obtainable from a cross-linked polymeric blend employing a halobutyl rubber. More particularly, Chlorobutyl Rubber 1165 available from Exxon Chemical Co. was substituted for the CDB of Composition 27. Although the physical properties were somewhat inferior to those obtained from Formula 27, they were still adequate and the material provided self-amalgamation.

The chlorobutyl rubber formulas evaluated are set forth below.

| | Formula | |
|---|---|---|
| | 34 | 35 |
| | parts | |
| Chlorobutyl Rubber 1165 (Exxon) | 42.26 | 42.26 |
| Vistanex LM-MS | 13.55 | 13.55 |
| Carbon Black N550 | 21.13 | 21.13 |
| Dow 2045 LLDPE | 5.96 | 5.96 |
| Wingtack 95 | 8.67 | 8.67 |
| Vistalon 1721 | 5.96 | 5.96 |
| Irganox 1010 | 0.85 | 0.85 |
| AC6 - PE | 1.63 | 1.63 |
| ZnO | — | 1.63 |
| Steric Acid | — | 0.54 |
| DCP-40C | — | 1.63 |

The formulas were compounded by mixing the elastomers and polymers in a Banbury mixer to a temperature of 125° whereupon the tackifiers, antioxidents, and carbon black (with dispersing wax) were added. If used, the conventional stabilizers, zinc oxide, steric acid and DCP were also added. The mixing temperature was maintained below 135°. The batch was dropped after three minutes of flux following the addition of all ingredients.

When formed into strips, prior to any additional treatment, the strips exhibited a very smooth, glossy finish which self-amalgamated almost instantly. However, as can be observed from the following table, the tensile stength and percent elongation were inadequate.

In order to enhance these characteristics, cross-linking the material both by chemical/thermal and irradiation means were attempted. The chemical cross-linking techniques led to the formation of a much stronger material much resembling a pressure sensitive adhesive tape but with little capacity for self-amalgamation. High doses of electron beam irradiation exhibited similar results. However, lower dose exposure generated a material with somewhat reduced, albeit satisfactory, strength characteristics and a capacity for self-amalgamation. Accordingly, it was concluded that halobutyl rubbers in the present formulation provided irradiation, cross-linkable and tailorable self-amalgamating materials.

It was determined upon testing that the presence of stabilizers, such as zinc oxide, proved deleterious. In cold flow testing for splitting and separation, the samples including the zinc oxide split within one day whether irradiated or not. Thus, full attention was directed to Formula 34.

The following chart represents room temperature testing results obtained from graduated dosages of electron beam irradiation from a Dynamitron ® from Radiation Dynamics, Inc. of Melville, N.Y.

| Dose | Tensile | % Elongation |
|---|---|---|
| Mrad | | |
| 0 | 61 | 350 |
| 2 | 75 | 590 |
| 4 | 138 | >1000 |
| 6 | 142 | >1000 |
| 8 | 160 | ~900 |
| 10 | 160 | ~800 |

Evidently, the 2-6 Mrad dose range provides optimal strength and self-amalgamation.

Potential uses for this invention include forming a tape (with an interliner, of course,) for direct field application. The material may be incorporated into devices or wrappings which would benefit from self-amalgamating components. Also, strips of the material could be used to seal the edges of wraparound devices, etc.

In view of the foregoing, the skilled artisans should be able to contemplate variations and modifications of the examples provided, all of which are intended to fall within the scope and spirit of the invention as defined in the following claims.

I claim:

1. A conduit wrapping, comprising:
  a uniformly blended strip of self-amalgamating material composed of 3–14 parts polyolefin, 10–20 parts solid polyisobutylene tackifier, carbon black and a rubber blend composed of conjugated diene butyl rubber and halo $C_4$–$C_5$ olefin rubber.

2. A conduit wrapping according to claim 1 having 47–50 parts of the rubber blend.

3. A conduit wrapping according to claim 1 where the tackifier is poly-isobutylene.

4. A conduit wrapping according to claim 1 having 13–14 parts tackifier.

5. A conduit wrapping according to claim 1 where the polyolefin is a $C_2$–$C_3$ polyolefin.

6. A conduit wrapping according to claim 1 where the polyolefin is polyethylene.

7. A conduit wrapping according to claim 6 having 4–7 parts polyethylene.

8. A conduit wrapping according to claim 1 further comprising an additional rubber component selected from the group consisting of EPDM and polynorborene.

9. A conduit wrapping according to claim 1 which is cross-linked with ionizing irradiation.

10. A conduit wrapping according to claim 9 where the ionizing irradiation employed to effect cross-linking is an electron beam.

11. A conduit wrapping according to claim 10 which has been exposed to an electron beam dose of 2–8 megarads.

12. A conduit wrapping according to claim 1 further including an antioxidant.

* * * * *